US011792620B2

(12) United States Patent
Haran et al.

(10) Patent No.: US 11,792,620 B2
(45) Date of Patent: Oct. 17, 2023

(54) METHOD AND APPARATUS FOR C-V2X RADIO RESOURCE ALLOCATION

(71) Applicant: AUTOTALKS LTD., Kfar Netter (IL)

(72) Inventors: Onn Haran, Bnei Dror (IL); Ron Toledano, Tel Aviv (IL); Oleg Litmanovich, Qadima (IL)

(73) Assignee: Autotalks Ltd., Kfar Netter (IL)

(*) Notice: Subject to any disclaimer, the term of this patent is extended or adjusted under 35 U.S.C. 154(b) by 0 days.

(21) Appl. No.: 17/507,814

(22) Filed: Oct. 22, 2021

(65) Prior Publication Data

US 2022/0046398 A1    Feb. 10, 2022

Related U.S. Application Data

(63) Continuation of application No. 16/726,606, filed on Dec. 24, 2019, now Pat. No. 11,184,747.

(60) Provisional application No. 62/787,331, filed on Jan. 1, 2019.

(51) Int. Cl.
*H04W 4/40* (2018.01)
*H04W 72/02* (2009.01)
*H04L 5/16* (2006.01)
*H04W 72/0446* (2023.01)
*H04W 72/54* (2023.01)
*H04L 5/06* (2006.01)

(52) U.S. Cl.
CPC ............ *H04W 4/40* (2018.02); *H04L 5/06* (2013.01); *H04W 72/02* (2013.01); *H04W 72/0446* (2013.01); *H04W 72/54* (2023.01)

(58) Field of Classification Search
CPC ... H04W 4/40; H04W 72/02; H04W 72/0446; H04W 72/08; H04L 5/16
See application file for complete search history.

(56) References Cited

U.S. PATENT DOCUMENTS

| | | |
|---|---|---|
| 9,596,689 B2 | 3/2017 | Cai et al. |
| 10,149,338 B2 | 12/2018 | Mallick et al. |
| 10,390,274 B2 | 8/2019 | Kim et al. |
| 10,524,111 B2 | 12/2019 | Loehr et al. |
| 10,588,054 B2 | 3/2020 | Hehn et al. |
| 10,652,881 B2 | 5/2020 | Babaei et al. |
| 10,708,925 B2 | 7/2020 | Sun et al. |

(Continued)

OTHER PUBLICATIONS

Luis F. Abanto-Leon, Arie Koppelaar, Sonia Heemstra de Groot, "Enhanced C-V2X Mode-4 Subchannel Selection," IEEE 88th Vehicular Technology Conference (VTC-Fall), 2018 (Year: 2018).*

(Continued)

*Primary Examiner* — Michael Thier
*Assistant Examiner* — Nevena Zecevic Sandhu
(74) *Attorney, Agent, or Firm* — Nathan & Associates; Menachem Nathan

(57) ABSTRACT

Methods and apparatuses are provided for allocating cellular vehicle-to-everything (C-V2X) radio transmission resources for transmitting messages in a C-V2X network from amongst a pool of initial resources from within a plurality of subframes. For each subframe in the plurality of subframes, it is determined whether transmitting in the subframe is likely to cause reception degradation with other C-V2X messages being transmitted in the network, and if yes, all resources in the subframe are excluded prior to allocating a resource for transmission.

10 Claims, 7 Drawing Sheets

(56) References Cited

U.S. PATENT DOCUMENTS 11,317,382 B2* 4/2022 Lee .................. H04W 72/02
2019/0305903 A1* 10/2019 Badic ................ H04W 72/048

OTHER PUBLICATIONS

Rafael Molina-Masegosa; Javier Gozalvez; Miguel Sepulcre, "Configuration of the C-V2X Mode 4 Sidelink PC5 Interface for Vehicular Communication," 2018 14th International Conference on Mobile Ad-Hoc and Sensor Networks (MSN), 2018 (Year: 2018).*
Yongseok Jeon, Seungho Kuk and Hyogon Kim, "Reducing Message Collisions in Sensing-Based Semi-Persistent Scheduling (SPS) by Using Reselection Lookaheads in Cellular V2X," Sensors (journal published online by MDPI; https://www.mdpi.com/journal/sensors), Dec. 11, 2018 (Year: 2018).*

* cited by examiner

KNOWN ART

METHOD AND APPARATUS FOR C-V2X RADIO RESOURCE ALLOCATION

CROSS REFERENCE TO RELATED APPLICATIONS

This application is a continuation of U.S. patent application Ser. No. 16/726,606 filed Dec. 24, 2019 (now allowed) and is related to and claims the priority benefit of U.S. provisional patent application Ser. No. 62/787,331 filed Jan. 1, 2019.

FIELD

Embodiments disclosed herein relate generally to efficient C-V2X resource allocation, and more specifically to methods for self-allocating resource blocks in a manner that reduces the likelihood of transmission conflicts between vehicles that are likely to cause reception degradation.

BACKGROUND

The term "cellular vehicle-to-everything" or C-V2X refers to vehicular connectivity specifications defined by 3GPP (3rd Generation Partnership Project) using the LTE sidelink PC5 interface to support direct link communication between vehicles without involving a cellular base-station. A given LTE physical channel is divided into smaller fragments, both in time and frequency, which are referred to as "frames". A frame consists of 10 subframes in the time domain. Each subframe is 1 ms wide and contains two time-slots. In the frequency domain, a LTE frame is divided into 12 subcarriers, separated from each other by 15 kHz. The subcarriers are further divided into resource blocks (RB). Each radio resource consists of one subframe (1 ms) in time and a number of RBs in frequency. Several resources can occupy a single subframe. Devices that utilize a sidelink PC5 interface must reserve or "allocate" a resource for transmission. After a reservation or "latency" period, the same resource is used again for the next transmission. This pattern is repeated for a few seconds, after which a new resource is allocated.

Mode 4 of the LTE sidelink PC5 interface as defined by 3GPP Release 14 requires that a transmitting device autonomously allocate a resource from amongst a pool of potential resources. Thus the sidelink PC5 (Mode 4) allocation scheme as applied to C-V2X involves the C-V2X device listening to the communication channel and keeping a record of all received signals from other vehicles over the last 1 second (1000 subframes). This record is utilized to make intelligent resource selection decisions by excluding resources deemed too busy. A resource is then selected from amongst the non-excluded resources using a randomly selected counter. Release 15 of 3GPP follows the same resource allocation scheme. Release 16 is likely to follow the same scheme as well, renaming it as Mode 2.

It is important to note that while a single subframe includes multiple resources, an inherent limitation exists in the LTE sidelink PC5 in that a device transmitting in a subframe is disabled from receiving transmissions in that same subframe. Moreover, if several devices transmit in the same subframe, a receiving device within range of the transmitting devices might not be able to receive all of the transmissions, as the dynamic range of the receiving device's radio transceiver is not capable of coping with both the strongest and weakest signals.

As a result of the above limitations, the resource selection decision is an important one. Poor resource selection will limit the communication range of the transmission (e.g. if another vehicle transmits in the selected resource with a stronger signal), while a good selection decision will choose the resource with minimal interference to other vehicles. However, the existing scheme often results in a poor selection decision, because resources are probed individually without considering the utilization, or lack thereof, of other resources in the same subframe.

Thus, there remains a need for, and it would be advantageous to have, a more efficient allocation scheme which makes allocation decisions that consider the utilization of other resources in the same subframe.

SUMMARY

In various embodiments, there are provided, in a C-V2X communication unit for transmitting messages in a C-V2X network, methods for allocating radio transmission resources from amongst a pool of initial resources, the pool of resources comprised within a plurality of subframes, a method comprising determining, for each subframe in the plurality of subframes, whether transmitting in the subframe is likely to cause reception degradation with other C-V2X messages being transmitted in the network, and if yes, excluding all resources in the subframe prior to allocating a resource for transmission.

In various embodiments, there is provided a C-V2X communication unit for transmitting messages in a C-V2X network, the C-V2X communication unit configured to allocate radio transmission resources from amongst a pool of initial resources, the pool of resources comprised within a plurality of subframes, the C-V2X communication unit comprising a processor configured to determine, for each subframe in the plurality of subframes, whether transmitting in the subframe is likely to cause reception degradation with other C-V2X messages being transmitted in the network, and if yes, exclude all resources in the subframe prior to allocating a resource for transmission.

In some embodiments, the determining whether transmitting in the subframe is likely to cause reception degradation and if yes, excluding all resources in the subframe includes: a) setting an initial half-duplex ("HD") energy threshold; b) for each subframe in the plurality of subframes, excluding all resources within the subframe if at least one resource within the subframe has energy above the HD energy threshold; c) after the exclusion if the number of remaining resources is not greater than a predetermined percentage of initial resources, increasing the HD energy threshold; and d) repeating steps b) through c) until the number of remaining resources is greater than the predetermined percentage of initial resources.

In some embodiments, in step a) the initial HD threshold is set to between −70 dBm and −80 dBm, and in step b) the HD threshold is increased by between 3 dBm and 5 dBm.

In some embodiments, determining whether transmitting in the subframe is likely to cause reception degradation and if yes, excluding all resources in the subframe includes: a) setting an initial near-far ("NF") energy threshold; b) for each subframe in the plurality of subframes, excluding all resources within the subframe if at least one resource within the subframe that is allocated has energy below the NF energy threshold; c) after the exclusion if the number of remaining resources is not greater than a predetermined percentage of initial resources, decreasing the NF energy threshold; and d) repeating steps b) through c) until the number of remaining resources is greater than the predetermined percentage of initial resources.

In some embodiments, in step a) the initial NF threshold is set to between −70 dBm and −80 dBm, and in step b) the NF threshold is decreased by between 3 dBm and 5 dBm.

In some embodiments, the NF threshold is dependent on a Channel Busy Ratio (CBR) of the network.

In some embodiments, after excluding resources, an average energy for each remaining resource over a prior n subframes is determined, wherein the number of subframes n differs for each remaining resource.

In some embodiments, the average energy for a given remaining resource is determined by detecting whether a significant allocation change event occurred for the given resource; if yes, averaging the energy of the resource beginning from a time of detected significant allocation change to present time; and otherwise, averaging the energy of the resource over the last 1 second.

In some embodiments, a significant allocation change event for a resource includes at least one of, between two consecutive subframes comprising the resource, an allocation status of the resource being flipped, and a difference in energy of the resource being greater than a predetermined threshold.

BRIEF DESCRIPTION OF THE DRAWINGS

Non-limiting embodiments are herein described, by way of example only, with reference to the accompanying drawings, wherein.

DETAILED DESCRIPTION

Standard methods of allocating a C-V2X radio resource in Mode 4 of LTE sidelink PC5 involve narrowing down the pool of potential resources to a shortlist $S_A$ of available resources. The shortlist of available resources is further narrowed down to an even shorter list $S_B$ of candidate resources. A resource is then selected randomly from amongst the candidate resources. The process is iterative, in that if $S_A$ contains too few resources, $S_A$ is discarded and the entire process of narrowing down resources repeats using more relaxed exclusionary criteria until a satisfactory number of resources remain in $S_A$.

Figure 1:
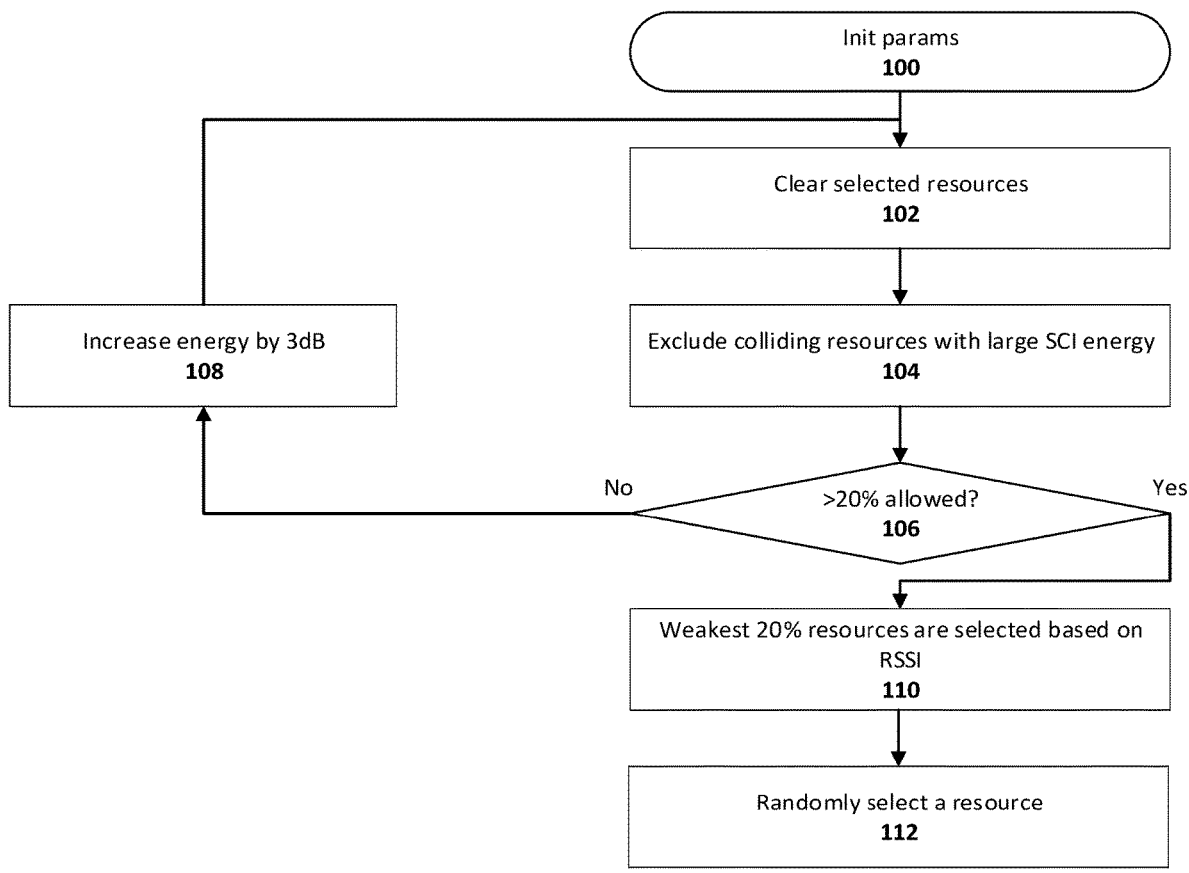
FIG. 1 shows schematically an embodiment of a method of allocating C-V2X radio resources according to known art.

FIG. 1 shows schematically the method for allocating C-V2X radio resources according to existing (known) art. Operation begins at step 100 by initializing various parameters for excluding resources, such as the SCI (Service Channel Indication) energy threshold. At step 102, the shortlist of resources $S_A$ is cleared. At step 104, resources occupied by SCI data and having SCI energy above the SCI energy threshold are excluded. The remaining resources are added to $S_A$. At step 106, a determination is made as to whether shortlist $S_A$ contains more than 20% of the initial resources. If No (i.e. 80% or more of all initial resources were excluded), at step 108 the SCI energy threshold is increased by 3 dB, and execution reverts back to step 102 where shortlist $S_A$ is cleared. Operation then continues at step 104, where resources are excluded whose energy now exceeds the higher SCI energy threshold. This iterative process continues until shortlist $S_A$ contains more than 20% of the initial resources. If yes in step 106, the process continues to step 110, where the resources in $S_A$ are sorted according to their respective energy levels, averaged over the last 1 second, and the weakest 20% are added to shorter list $S_B$ of candidate resources. The sorting is performed according to resources' RSSI (Received Signal Strength Indication) value, linearly averaged over the last 1 second. At step 112, a resource from amongst the candidate resources is selected randomly.

As explained next, this known art resource allocation scheme suffers from various drawbacks.

Changed Resource Allocation During the Last Second

At step 110 of the existing method, an average RSSI value is computed for each resource in $S_B$ using an averaging period of 1 second. However, the allocation state of any given resource may have changed during the last second. By averaging over a relatively large period of 1 second (1000 subframes), the current (known) scheme fails to consider a resource's allocation state change within the last second. Consider three cases:

In a first case, if during the last 1 second a resource was initially allocated by a close vehicle (high energy) but then became unallocated (no energy), after averaging the resource will appear as having some energy, thereby obscuring the resource's current state of being unallocated.

Conversely, in a second case, if during the last 1 second a resource was unallocated (no energy) and then became allocated by a close vehicle (high energy), after averaging the resource will appear to have low energy. This resource may still be considered for selection under the current scheme even though it should in fact be excluded because of its current high energy value.

Finally, in a third case, if during the last 1 second a resource had weak energy for most of the initial portion of the last second but then changed to strong energy towards the tail end, after averaging the resource will appear to have a weak signal. In reality though, the resource should be excluded since the current high energy is likely to cause collisions.

"Half-Duplex" and "Near-Far" Problems

A further drawback with the current resource allocation scheme is based on the inherent limitation described above whereby a vehicle cannot receive transmissions in the subframe in which the vehicle is transmitting. This limitation gives rise to the well-known "half-duplex" problem, where two vehicles each transmit in different resources in the same subframe. Another limitation in C-V2X message transmission arises in which a strong signal, which may be received from a near vehicle, may drown out a weaker signal, e.g. from a vehicle further away. This has become known as the "near-far" problem.

Figure 2:
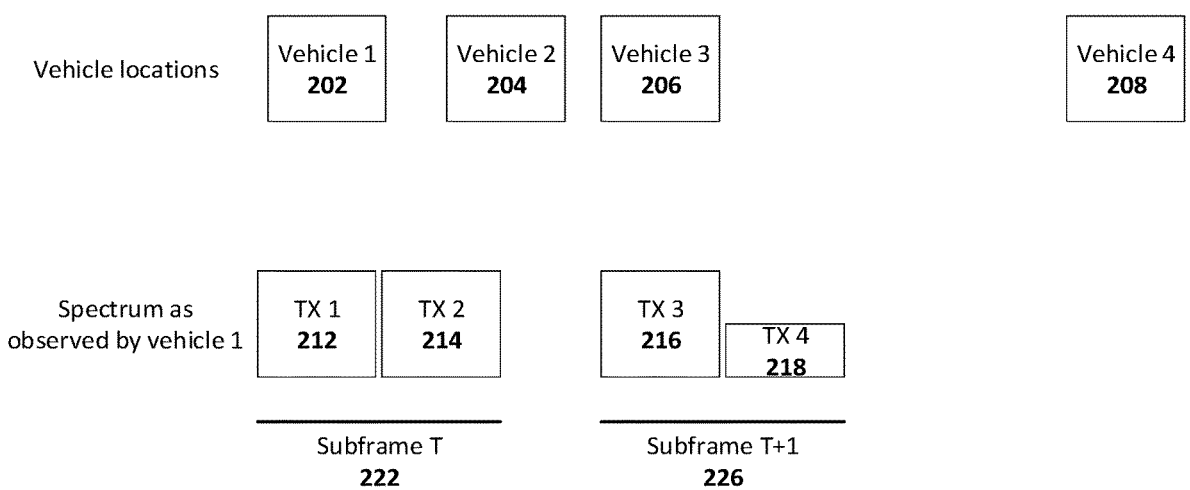
FIG. 2 demonstrates graphically a known half-duplex problem and near-far problem.

FIG. 2 demonstrates graphically the half-duplex problem and near-far problem.

Four vehicles 202, 204, 206 and 208 are concurrently transmitting C-V2X messages. The transmissions are labelled TX-1 212, TX-2 214, TX-3 216 and TX-4 218, respectively. Vehicles 202 and 204 each transmit in subframe 222, so these vehicles will not receive each other's messages even though they are close to one another. This is due to the half-duplex problem which arose when they each randomly selected the same subframe. Vehicles 206 and 208 each transmit in the next subframe 226, so vehicles 206 and 208 will also not receive each other's messages.

Further with reference to FIG. 2, vehicle 206 and vehicle 208 transmit using different resources in the same subframe. In this case, vehicle 202, which is closer to vehicle 206 than to vehicle 206, will receive the messages transmitted by vehicle 206 but not the messages transmitted by vehicle 208 due to the stronger signal of TX-3 216 transmitted by vehicle 206. In some cases, this situation may be tolerable or even unavoidable, however ideally it is preferable to be able to receive both messages. Thus, the current PC5 scheme suffers from the additional drawback that in a non-congested network, no attempt is made to mitigate the problems described above by giving preference to allocating resources in vacant subframes.

Having described the existing drawbacks, various embodiments disclosed herein provide a method, executed by a C-V2X communication unit transmitting in a C-V2X network, of allocating C-V2X radio resources efficiently so as to minimize conflicts between resources in the same subframe that are likely to cause reception degradation with other C-V2X transmissions in the network. As used herein, "reception degradation" should be understood to include reception that is affected by half-duplex problems and/or near-far problems. The method considers i) the likelihood of a resource, if utilized, to cause half-duplex problems, ii) the likelihood of a resource, if utilized, to cause near-far problems, and iii) any significant allocation change events within the last 1 second, as will be explained below.

Figure 3A:
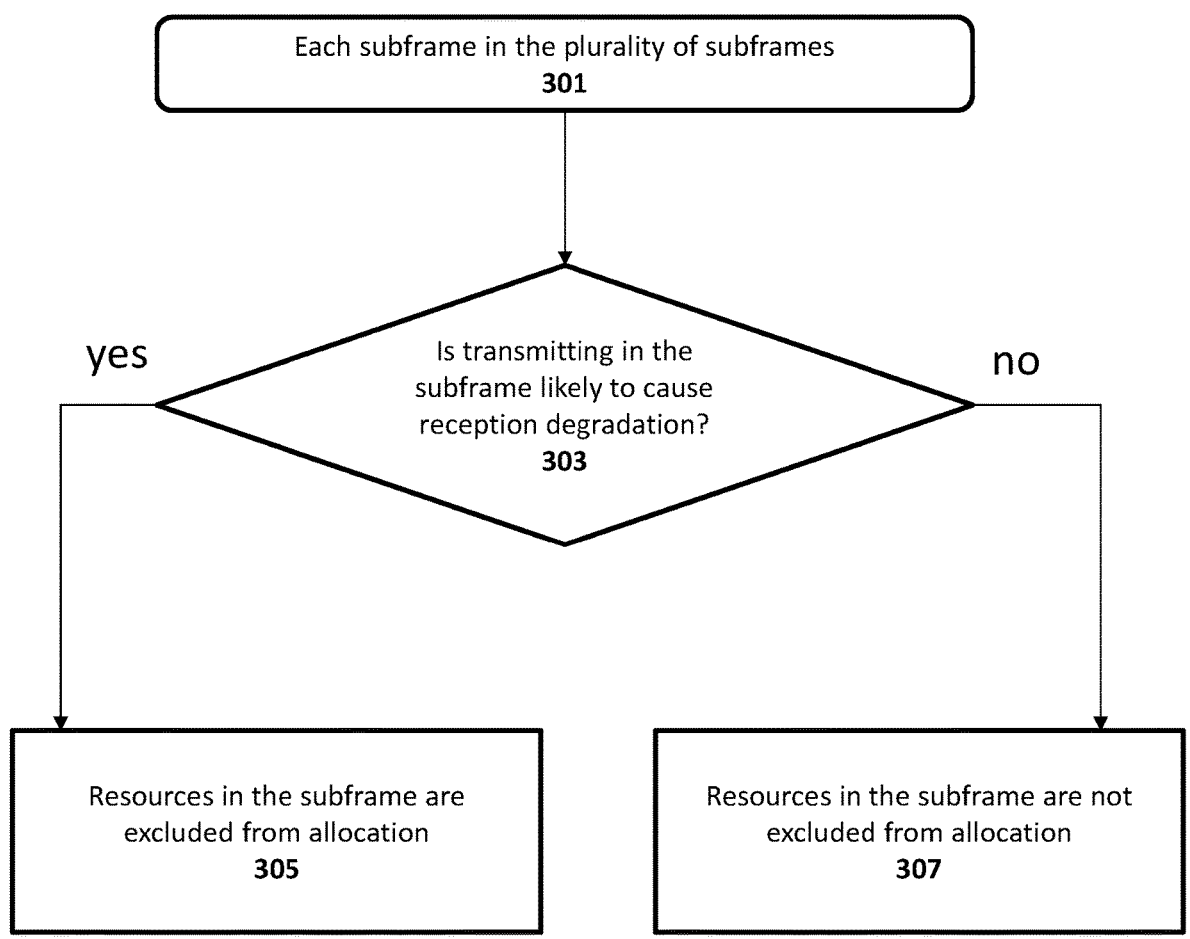
FIG. 3A shows schematically a high level flowchart of an embodiment of a method of allocating C-V2X radio resources accordingly to the presently disclosed subject matter.
Figure 3B:
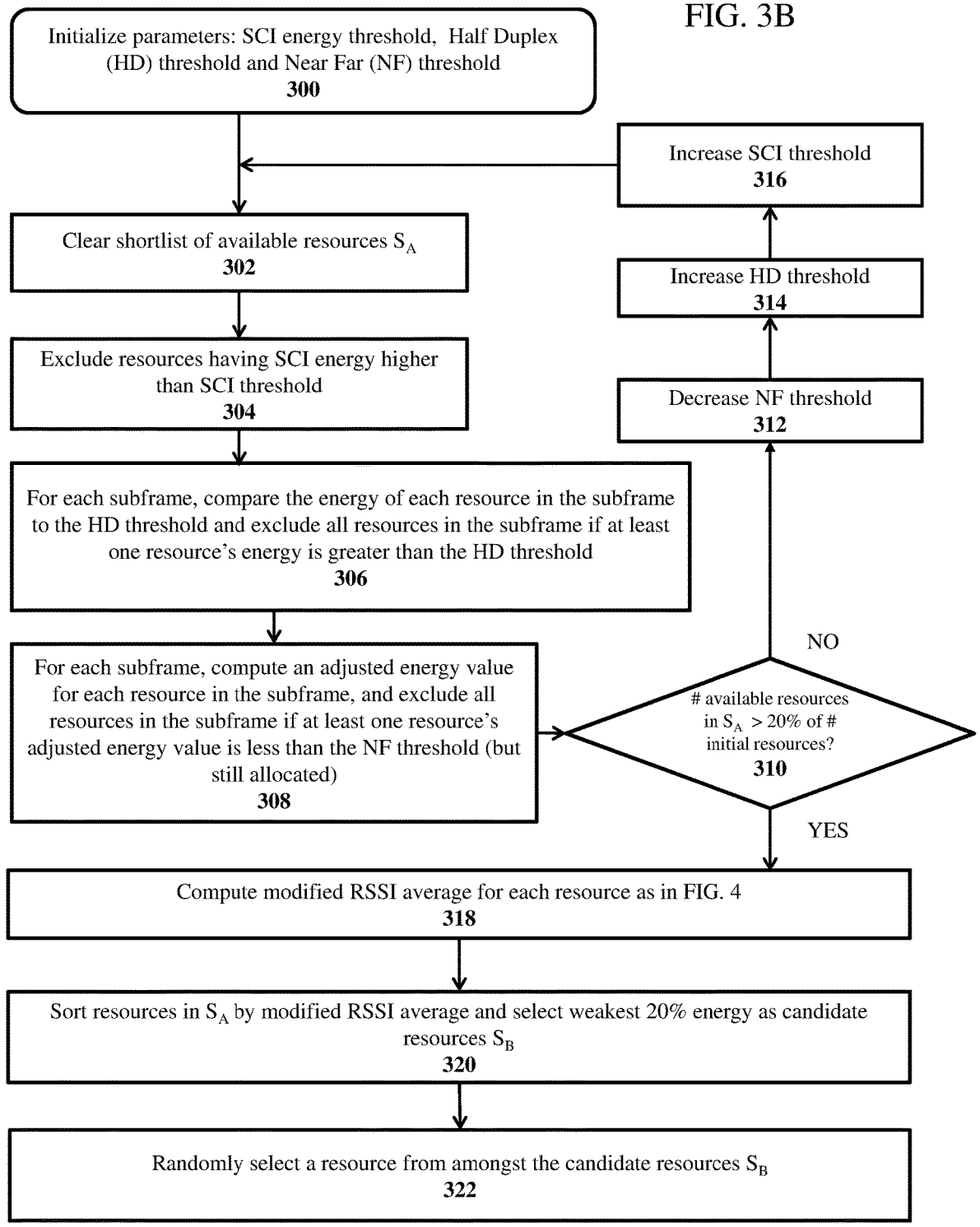
FIG. 3B shows more details of various steps in the method of embodiment of FIG. 3A.

FIGS. 3A-3B show schematically an exemplary embodiment of a method for, in a C-V2X communication unit for transmitting messages in a C-V2X network, allocating radio transmission resources from amongst a pool of initial resources, the pool of resources comprised within a plurality of subframes. Referring now to FIG. 3A, which shows a high-level flowchart, the method takes as input 301 each subframe in the plurality of subframes. At step 303, the method includes determining, for each subframe, whether transmitting in the subframe is likely to cause reception degradation with other C-V2X messages being transmitted in the network. If yes, at step 305 resources in the subframe are excluded from allocation. If no, at step 307 resources in the subframe are not excluded from allocation.

FIG. 3B shows more details of steps 303-307 of FIG. 3A. At step 300, three parameters are initialized: an SCI energy threshold, a half-duplex (HD) threshold and a near-far (NF) threshold. Initializing the SCI initial energy is known in the art (step 100 of FIG. 1). In alternative embodiments, only two thresholds may be initialized, e.g. the SCI energy threshold and the HD threshold, or the SCI energy threshold and the NF threshold. The HD threshold and NF threshold are used to exclude resources with potential half-duplex problems and near-far problems, respectively. The initial HD threshold may be set to a relatively low energy value, for example about −70 dBm to about −80 dBm. The initial NF threshold may be set to an energy value of about −70 dBm to about −80 dBm.

In some embodiments, the value of the NF threshold may depend on the network's channel busy ratio (CBR), with the underlying rationale being that in congested networks, i.e. networks with high CBR, near-far problems cannot be avoided anyway, so excluding resources on such basis would be too limiting. As an example of the dependency on CBR, in a network with a CBR of 15%, the NF threshold may be decreased by 15, e.g. from −80 dBm to −95 dBm. In a network with a CBR of 25%, the NF threshold may be decreased by 25, e.g. from −80 dBm to −105 dBm.

Steps 302-304 are also similar to steps in known art (steps 102-104 of FIG. 1,). At step 302, the shortlist $S_A$ of available resources is cleared, and at step 304, resources that are occupied by SCI (Service Channel Indication) data and having energy above the SCI energy threshold are excluded. Steps 306-308 show further details of steps 303-307 of FIG. 3A. At step 306, and in contrast with known methods, resources that pose a potential to a half-duplex problem are excluded. The available resources (i.e. those not excluded in step 304) in each subframe may be grouped according to their respective subframe. For each given subframe, the energy of each resource within the given subframe is compared with the HD threshold. If the energy of at least one resource in the subframe is greater than the HD threshold, all of the resources in the given subframe are excluded. The energy of a resource may be determined by computing the average RSSI value for the resource in the given subframe.

At step 308 and in contrast with known methods, resources that pose a potential NF problem are excluded. An energy value (e.g. RSSI) is computed for each remaining resource (i.e. those resources not excluded in either of steps 304 or 306). The energy value is compared with the NF threshold. As detailed above, in some embodiments, the NF threshold may be a function of the network's CBR. Each resource's energy value is compared with the NF threshold. If within any given subframe, a resource's energy value is lower than the NF threshold but is allocated (i.e. has SCI energy), all of the resources in the given subframe are excluded. Non-excluded resources are then added to the shortlist $S_A$.

At step 310, it is determined whether the number of resources in $S_A$ is more than a predetermined percentage of the number of all initial resources, e.g. 20%. If not, too many resources were excluded in steps 304-308. At this point, the exclusionary criteria are relaxed. At step 312, the NF threshold is decreased, preferably by between about 3 dBm and 5 dBm. At step 314, the HD threshold is increased, preferably by between about 3 dBm and 5 dBm. At step 316, the SCI energy threshold is increased by 3 dB as in the known art (step 108 of FIG. 1). Execution then reverts back to step 302, where the shortlist $S_A$ is cleared, and steps 304-308 are repeated using the new thresholds. This iterative process continues until at step 310 it is determined that the shortlist $S_A$ contains more than 20% of the initial resources, at which point execution continues at step 318.

At step 318, a modified average energy value is computed for each resource in $S_A$. The modified average energy considers significant allocation change events, as will be detailed below with reference to FIG. 4.

At step 320, the resources in $S_A$ are sorted according to their respective modified average energy values as computed in step 318, and the lowest (i.e. weakest energy) 20% are selected as candidate resources $S_B$. At step 322, a resource from amongst the candidate resources in $S_B$ is selected randomly.

Figure 4:
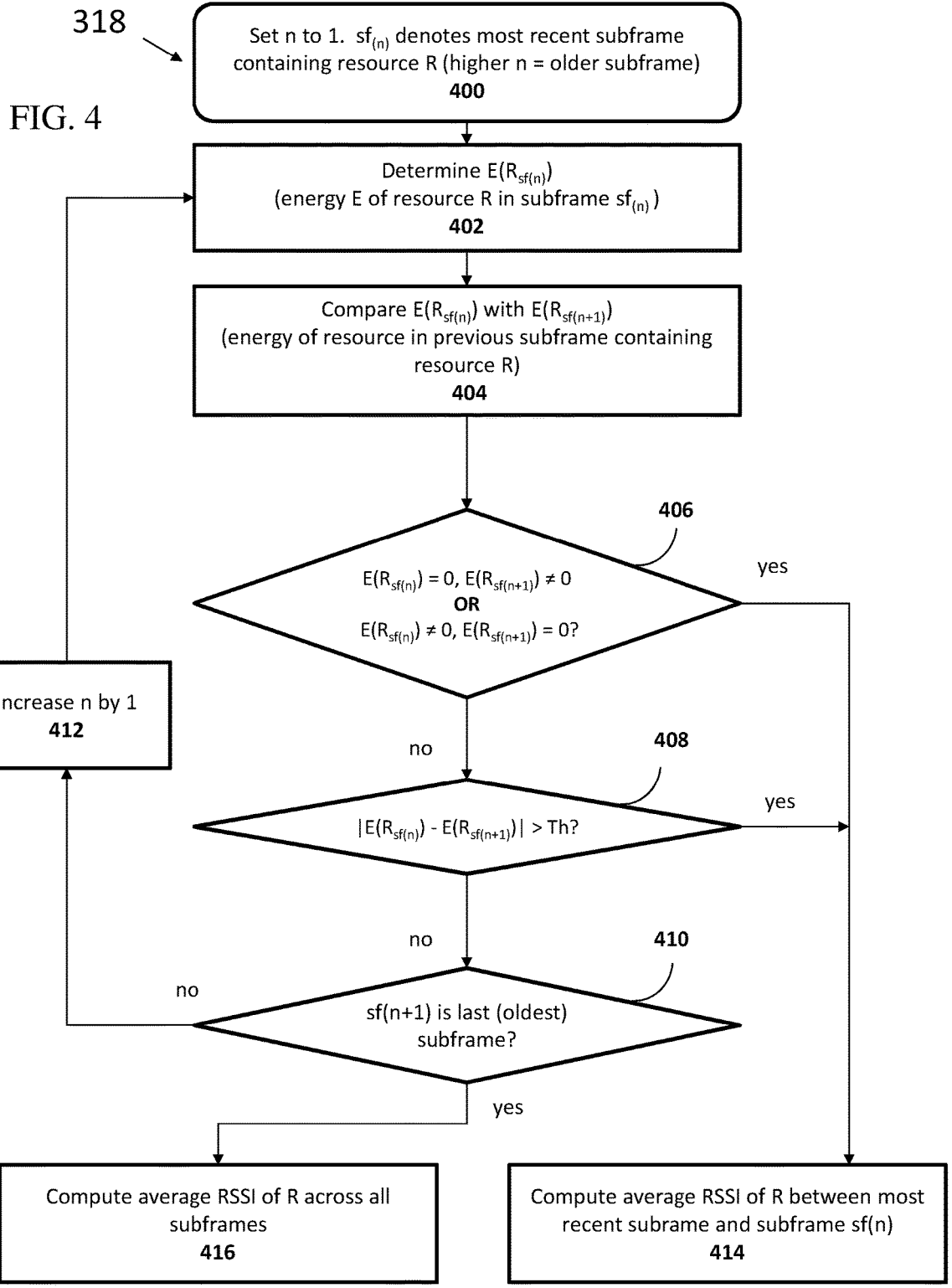
FIG. 4 shows schematically an embodiment of a method of computing a modified energy value for resources in $S_A$ accordingly to the presently disclosed subject matter.
Figure 5:
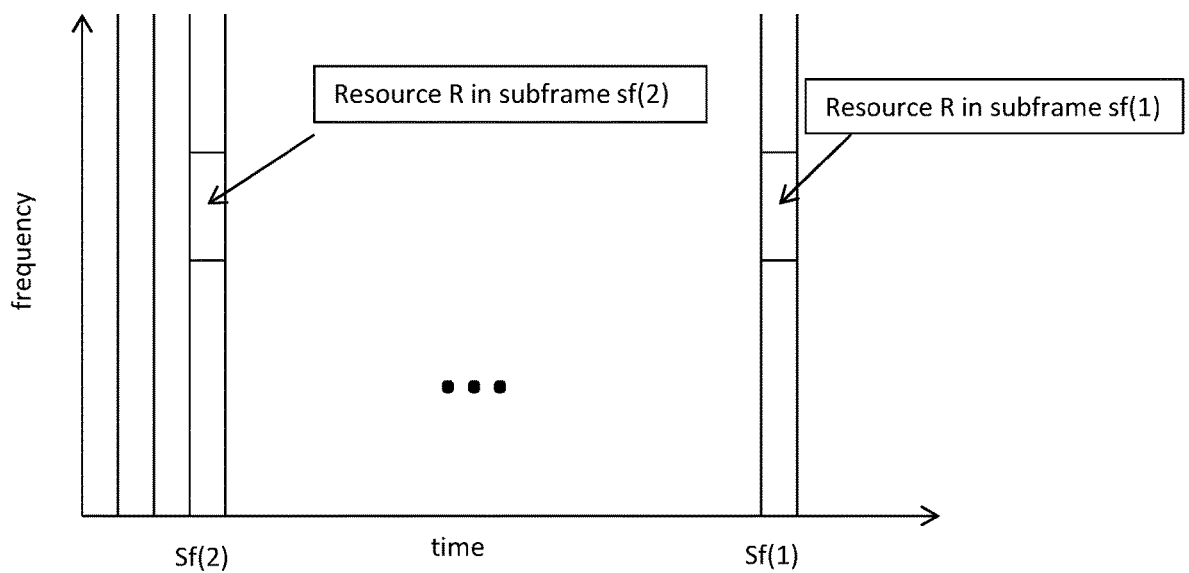
FIG. 5 shows schematically consecutive subframes containing a resource R.

FIG. 4 shows schematically an embodiment of a method of computing a modified average energy value that considers significant allocation change events. The method may be performed by the MAC (Media Access Control) layer interface. As used herein, "significant allocation event" refers to a flipped allocation status (allocated to unallocated or vice versa), or to an energy level gain or drop between subsequent subframes in an amount greater than a predetermined threshold Th. The $n^{th}$ subframe is denoted sf(n). Only subframes in the last 1 second that contain resource R are considered. Subframes are numbered in reverse chronological order such that sf(1) represents the most recent subframe containing resource R, and sf(2) represents the subframe containing R that is just prior to sf(1), as shown in FIG. 5.

At step 400, parameters are initialized by setting n=1. At step 402, the energy E of resource R in the $n^{th}$ subframe, denoted $E(R_{sf(n)})$, is determined. At step 404, the value determined in step 402 is compared with the energy E of resource R in the $(n+1)^{th}$ subframe, denoted $E(R_{sf(n+1)})$. At step 406, it is determined whether the allocation status flipped, meaning either the resource was allocated in sf(n) (i.e. $E(R_{sf(n)}) \neq 0$) and not allocated in sf(n+1) (i.e. $E(R_{sf(n+1)})=0$) or vice versa. The allocation state of a resource can alternatively be determined by examining the SCI energy level. If at step 406 it is determined that the allocation status flipped, execution continues at step 414, where the average RSSI is computed for resource R between the most recent subframe and subframe sf(n). Otherwise, execution continues to step 408, where it is determined whether the difference in energy of resource R between subframes sf(n) and sf(n+1) is greater than a predetermined threshold Th. Suitable values for Th can be, for example, any value between 10-20 dB. If the difference in energy is greater than Th, execution continues at step 414, where the average RSSI is computed for resource R between the most recent subframe and subframe S(n). Otherwise, execution continues at step 410 where it is determined whether sf(n+1) is the last (i.e. oldest) subframe containing resource R. If Yes, execution continues at step 416 where the average RSSI is computed for resource R across all subframes. Otherwise, execution continues at step 412 where n is increased by one (1) and steps 402-410 are repeated until either a significant allocation change has been detected (steps 406 or 408 evaluate to true), or all subframes have been examined (step 410 evaluates to true).

Figure 6:
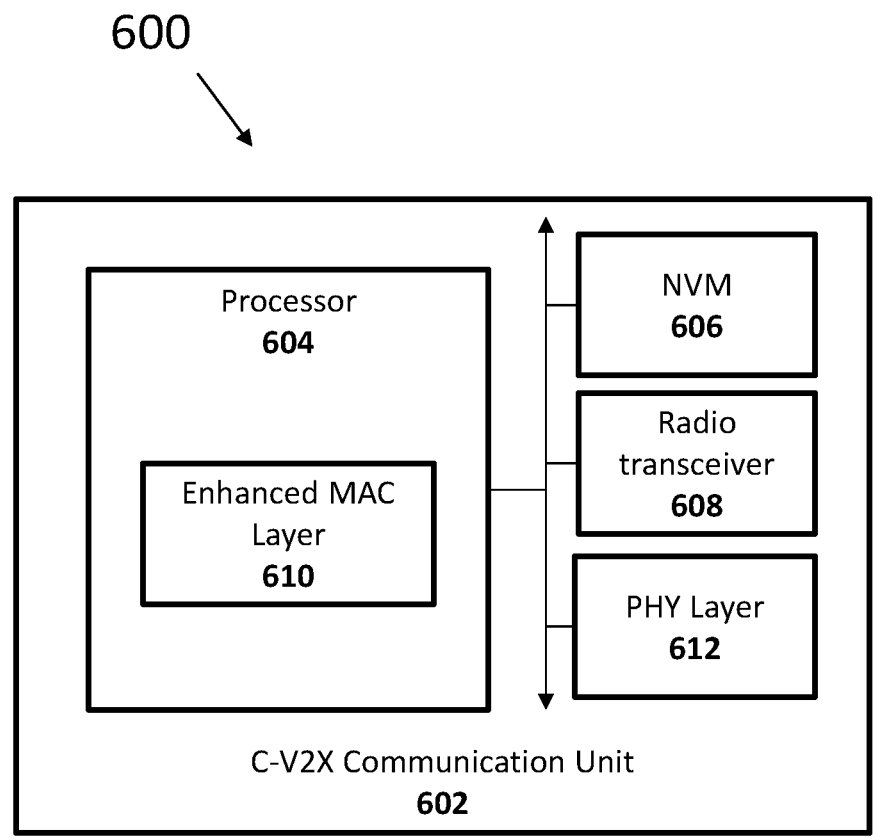
FIG. 6 shows a block diagram of an embodiment of a system for allocating C-V2X radio resources accordingly to the presently disclosed subject matter.

FIG. 6 shows a block diagram of an embodiment of a system 600 for allocating C-V2X radio resources. System 600 includes a C-V2X communication unit 602 configured to transmit and receive C-V2X messages, including configuration for performing related activity necessary for transmitting and receiving C-V2X messages. C-V2X communication unit 602 includes a processor 604, a non-volatile memory (NVM) 606, a radio transceiver 608, and a PHY (Physical) Layer 612 all operatively coupled with one another. PHY Layer 612 is configured to send and receive radio signals to/from radio transceiver 608 and to perform PHY transport layer functions, including sensing resource energy levels and providing sensing reports to the processor. Processor 604 includes an enhanced MAC layer 610 configured to perform MAC layer transport functions including allocating C-V2X radio resources for transmitting C-V2X messages according to the methods described herein. In some embodiments, the enhanced MAC Layer 610 can alternatively reside outside of processor 604 and be operatively coupled to processor 604 or even comprise its own processor. In operation, the enhanced MAC layer 610 requests a sensing report from the PHY layer 612, and the PHY Layer 612 returns the requested report. The sensing report contains the energy values of all resources in the last 1 second (1000 subframes). These values may be stored in NVM 606. Using the sensing report, the enhanced MAC layer 610 executes steps 303-307 of FIG. 3A and steps 300-322 of FIG. 3B in order to allocate C-V2X resources according to the method described herein.

It should be noted that the method described above and in FIGS. 3A-3B should be understood to include (i) embodiments in which resources are excluded only on the basis of potential HD problems only (steps 306 and 314 of FIG. 3B), (ii) embodiments in which resources are excluded only on the basis of potential NF problems (steps 308 and 312 of FIG. 3B), (iii) embodiments in which a modified average energy value is calculated for resources in $S_A$ (step 318 of FIG. 3B) without excluding resources for potential HD problems or potential NF problems, and (iv) embodiments that include any combination of (i), (ii) and (iii).

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A method, comprising: in a cellular vehicle-to-everything (C-V2X) network:
receiving a subframe that includes a plurality of resource blocks;
in response to determining whether transmitting in a resource block of the subframe is likely to cause reception degradation for C-V2X messages being transmitted in other resource blocks of the subframe, excluding all resource blocks in the subframe from allocation for transmission; and, after excluding the all resource blocks,
determining an average energy for each remaining resource block over a number n of prior subframes, wherein the number of subframes n differs for the each remaining resource block.

2. The method of claim 1, wherein in response to the determining whether transmitting in the resource block of the subframe is likely to cause reception degradation for other C-V2X messages being transmitted in the other resource blocks of the subframe, excluding the all resource blocks in the subframe from allocation for transmission comprises:
i) setting an initial half-duplex ("HD") energy threshold,
ii) for each subframe in a plurality of subframes, excluding all resource blocks within a subframe in the plurality of subframes in response to at least one resource block within the subframe in the plurality of subframes having energy above the HD energy threshold,
iii) after the exclusion, in response to a number of remaining resource blocks not being greater than a predetermined percentage of initial resource blocks, increasing the HD energy threshold, and
iv) repeating steps ii and iii until the number of the remaining resource blocks is greater than the predetermined percentage of the initial resource blocks.

3. The method of claim 2, wherein the initial HD energy threshold is set to between −70 dBm and −80 dBm, and wherein the HD energy threshold in ii is increased by between 3 dBm and 5 dBm.

4. The method of claim 1, wherein the average energy for a given remaining resource block is determined by detecting whether a significant allocation change event occurred for the given remaining resource block, and in response to determining that the significant allocation change event occurred for the given remaining resource block, averaging the energy of the given remaining resource block beginning from a time of detected significant allocation change to a present time.

5. The method of claim 4, wherein in response to the detecting whether the significant allocation change event occurred for the given remaining resource block indicates that the significant allocation change event did not occur, the method further comprises averaging the energy of the given remaining resource block over the last 1 second.

6. A cellular vehicle-to-everything (C-V2X) communication unit for transmitting messages in a C-V2X network, comprising:
   a processor configured to receive a subframe that includes a plurality of resource blocks, to determine whether transmitting in a resource block of the subframe is likely to cause reception degradation for C-V2X messages being transmitted in other resource blocks of the subframe, and, if yes, to exclude all resource blocks in the subframe from allocation for transmission, and, after excluding the all resource blocks, to determine an average energy for each remaining resource block over a number n of prior subframes, wherein the number of subframes n differs for the each remaining resource block.

7. The C-V2X communication unit of claim 6, wherein the processor configuration further includes a configuration to:
   i) set an initial half-duplex ("HD") energy threshold,
   ii) for each subframe in a plurality of subframes, exclude all resource blocks within a subframe in the plurality of subframes if at least one resource block within the subframe in the plurality of subframes has energy above the HD energy threshold,
   iii) after the exclusion, if a number of remaining resource blocks is not greater than a predetermined percentage of initial resource blocks, increase the HD energy threshold, and
   iv) repeating steps ii and iii until the number of the remaining resource blocks is greater than the predetermined percentage of the initial resource blocks.

8. The C-V2X communication unit of claim 7, wherein the initial HD energy threshold is set to between −70 dBm and −80 dBm, and wherein the HD energy threshold in ii is increased by between 3 dBm and 5 dBm.

9. The C-V2X communication unit of claim 6, wherein the processor is configured to determine the average energy for a given remaining resource block by detecting whether a significant allocation change event occurred for the given remaining resource block, and if yes, averaging the energy of the given remaining resource block beginning from a time of detected significant allocation change to a present time.

10. The C-V2X communication unit of claim 9, wherein if the detecting whether the significant allocation change event occurred for the given remaining resource block indicates that the significant allocation change event did not occur, the processor is further configured to average the energy of the given remaining resource block over the last 1 second.

* * * * *